(12) United States Patent
Wan

(10) Patent No.: US 7,265,477 B2
(45) Date of Patent: Sep. 4, 2007

(54) STEPPING ACTUATOR AND METHOD OF MANUFACTURE THEREFORE

(76) Inventor: Chang-Feng Wan, 16210 Shadybank Dr., Dallas, TX (US) 75248

( * ) Notice: Subject to any disclaimer, the term of this patent is extended or adjusted under 35 U.S.C. 154(b) by 47 days.

(21) Appl. No.: 11/028,409

(22) Filed: Jan. 3, 2005

(65) Prior Publication Data

US 2005/0146241 A1 Jul. 7, 2005

Related U.S. Application Data

(60) Provisional application No. 60/607,723, filed on Sep. 7, 2004, provisional application No. 60/575,986, filed on Jun. 1, 2004, provisional application No. 60/566,901, filed on Apr. 30, 2004, provisional application No. 60/559,693, filed on Apr. 2, 2004, provisional application No. 60/534,302, filed on Jan. 5, 2004.

(51) Int. Cl.
*H02N 1/00* (2006.01)
*H01H 59/00* (2006.01)
*G02B 26/00* (2006.01)

(52) U.S. Cl. .................. 310/309; 359/223; 200/181

(58) Field of Classification Search ............ 310/309; 200/181; 257/600
See application file for complete search history.

(56) References Cited

U.S. PATENT DOCUMENTS

| | | | |
|---|---|---|---|
| 4,203,128 A * | 5/1980 | Guckel et al. ............ 331/156 |
| 4,990,229 A | 2/1991 | Campbell et al. |
| 5,142,414 A * | 8/1992 | Koehler .................. 359/578 |
| 5,242,863 A | 9/1993 | Xiang-Zheng et al. |
| 5,397,962 A | 3/1995 | Moslehi |
| 5,448,068 A | 9/1995 | Lee et al. |
| 5,479,042 A * | 12/1995 | James et al. |
| 5,493,177 A | 2/1996 | Muller et al. |
| 5,550,090 A | 8/1996 | Ristic et al. |
| 5,619,061 A * | 4/1997 | Goldsmith et al. |
| 5,774,252 A * | 6/1998 | Lin et al. ................. 359/224 |
| 5,801,383 A | 9/1998 | Wada et al. |
| 5,824,978 A * | 10/1998 | Karasik et al. |
| 5,891,751 A | 4/1999 | Kurtz et al. |
| 5,921,461 A | 7/1999 | Kennedy et al. |
| 5,929,497 A | 7/1999 | Chavan et al. |
| 6,060,336 A | 5/2000 | Wan |
| 6,093,579 A | 7/2000 | Sathe |
| 6,117,787 A | 9/2000 | Park |
| 6,135,856 A | 10/2000 | Tjaden et al. |
| 6,258,223 B1 | 7/2001 | Cheung et al. |
| 6,262,417 B1 | 7/2001 | Ju |
| 6,284,149 B1 | 9/2001 | Li et al. |
| 6,294,425 B1 | 9/2001 | Hideki |
| 6,307,452 B1 * | 10/2001 | Sun |
| 6,376,787 B1 * | 4/2002 | Martin et al. |

(Continued)

OTHER PUBLICATIONS

Ultra-fast low actuation voltage MEMS switch, Apr. 8, 2004, George Barbastathis et al.

(Continued)

*Primary Examiner*—Burton Mullins

(57) ABSTRACT

An embodiment of the present invention provides a stepping actuator, comprising a suspended membrane comprising a plurality of movable electrodes connected by plurality of spring hinges to a payload platform; and anchors connecting said membrane to a substrate, said substrate comprising a plurality of fixed electrodes; wherein said movable electrodes of said suspended membrane and said fixed electrodes from said substrate form parallel-plate electrostatic sub-actuators.

13 Claims, 20 Drawing Sheets

U.S. PATENT DOCUMENTS

| | | |
|---|---|---|
| 6,440,289 B1 | 8/2002 | Woo et al. |
| 6,441,449 B1 * | 8/2002 | Xu et al. .................... 257/414 |
| 6,534,850 B2 | 3/2003 | Liebeskind |
| 6,543,292 B1 | 4/2003 | Colton et al. |
| 6,547,973 B2 | 4/2003 | Field |
| 6,570,750 B1 | 5/2003 | Calcatera et al. |
| 6,593,242 B2 | 7/2003 | Morgenstern |
| 6,608,268 B1 * | 8/2003 | Goldsmith |
| 6,635,919 B1 * | 10/2003 | Melendez et al. |
| 6,657,525 B1 * | 12/2003 | Dickens et al. |
| 6,657,832 B2 * | 12/2003 | Williams et al. |
| 6,724,125 B2 * | 4/2004 | Hung et al. |
| 6,927,352 B2 * | 8/2005 | Bouche et al. |
| 7,027,284 B2 * | 4/2006 | Kobayashi et al. |
| 2002/0179421 A1 * | 12/2002 | Williams et al. |
| 2003/0107789 A1 * | 6/2003 | Hishioka .................... 359/223 |
| 2004/0219706 A1 * | 11/2004 | Wan ........................... 438/53 |

OTHER PUBLICATIONS

A vertical electrostatic actuator with extended digital range via tailored topology, Yanhang Zhang et al.

* cited by examiner

STEPPING ACTUATOR AND METHOD OF MANUFACTURE THEREFORE

CROSS-REFERENCE TO RELATED APPLICATIONS

This application claims the benefit of provisional patent application No. 60/534,302, filed Jan. 5, 2004 and provisional patent application No. 60/559,693 filed Apr. 2, 2004 and provisional patent application No. 60/566,901 filed Apr. 30, 2004 and provisional patent application No. 60/575,986 filed Jun. 1, 2004, and provisional patent application 60/607,723 filed Sep. 7, 2004.

BACKGROUND

Electrostatic forces have been used to move structures. Traditional electrostatic devices were constructed from laminated films cut from plastic or Mylar materials. A flexible electrode was attached to the film, and another electrode was affixed to a base structure. Electrically energizing the respective electrodes created an electrostatic force attracting the electrodes to each other or repelling them from each other. A representative example of these devices is found in U.S. Pat. No. 4,266,399. These devices work well for typical motive applications, but these devices cannot be constructed in dimensions suitable for miniaturized integrated circuits, biomedical applications, or MEMS structures.

Micromachined MEMS devices have also utilized electrostatic forces to move microstructures. Some MEMS electrostatic devices use relatively rigid cantilever members, as found in U.S. Pat. No. 5,578,976. Other MEMS devices disclose curved electrostatic actuators. However, some of these devices incorporate complex geometries using relatively difficult micro-fabrication techniques. U.S. Pat. Nos. 5,629,565 and 5,673,785 use dual micromechanical substrates to create their respective electrostatic devices. The devices described in U.S. Pat. Nos. 5,233,459 and 5,784,189 are formed by using numerous process steps. Complex operations are required to create corrugations in the flexible electrodes. In addition, U.S. Pat. No. 5,552,925 also discloses a curved electrostatic electrode. However, the electrode is constructed from two portions, a thinner flexible portion followed by a flat cantilever portion.

Several of the electrostatic MEMS devices include an air gap between the substrate surface and the electrostatic actuator. The electrostatic actuators generally include flexible, curled electrodes. Typically, the gap starts at the beginning of the electrostatic actuator where it separates from the substrate surface and increases continuously along the length of the air gap. The size of the air gap increases as the actuator curls further away from the substrate surface along its length. The air gap separation between the substrate electrode and actuator electrode affects the operating voltage required to move the actuator. The larger the air gap, the higher the voltage required operating the actuator. Further, due to manufacturing process and material variations, size and shape of the air gap can vary substantially from device to device, making operation erratic.

MEMS actuators using electrostatic force as means of moving, shaping or actuating a payload are integral part of many, if not most Micro-Electro-Mechanical Systems (MEMS). They have low power consumption and small size. These include parallel-plate actuator, cantilever actuator, torsional drive, comb drive, rotary motor, and scratch drive. Of these, only parallel-plate actuator generates strict vertical (out-of-plane) displacement. A schematic of the parallel-plate actuator is shown in FIG. 1. It comprises a movable electrode 10, a fixed electrode 20, spring 82 as hinges, a pair of pillars 30 on substrate 1. The movable electrode 10 is suspended by the spring hinges 82, which have a spring constant k, and is substantially parallel to the fixed electrode 20 with air gap $g_o$ in between. A voltage $V_{in}$ applied between the two electrodes gives rise to a force F and a displacement that can be calculated by the following equations:

$$F = \frac{\varepsilon \cdot A \cdot V_{in}^2}{2g^2} \text{ and } g = g_o - \frac{\varepsilon \cdot A \cdot V_{in}^2}{2k \cdot g^2} \quad \text{EQ. 1}$$

where g is the instantaneous air gap, $\varepsilon$ is dielectric constant, A is area of the smaller electrode. Note that this is now a cubic equation for the gap. As we increase the voltage, the air gap decreases, with the amount of decrease growing as the air gap gets smaller. Thus there is positive feedback in this system, and at some critical voltage, the system goes unstable, and the air gap collapses to zero. This phenomenon is called pull-in. The air gap at which the pull-in occurs is given by $g_{PI} = \frac{2}{3} \cdot g_o$. That is, the movable electrode is pulled down by ⅓ of the original air gap. At this value of air gap, the pull-in voltage is $$V_{PI} = \sqrt{\frac{8k \cdot g_o^3}{27\varepsilon \cdot A}} \quad \text{EQ. 2}$$

The parallel-plate electrostatic actuators normally operate in the analog regime, that is, the initial ⅓ of the air gap, prior to the pull-in. An analog voltage signal is applied between the two electrode plates to attain a displacement given by EQ. 1. It can be seen that the displacement is a non-linear function of the applied voltage. Such non-linear behaviors present a challenge to many MOEMS (Micro-Optical-Electro-Mechanical-System) applications requiring accurate positioning, including tunable Fabry-Perot filter and vertical cavity surface emitting laser (VCSEL), used for wavelength band selection in optical communications. The accuracy requirement can only be met with closed-loop control schemes. In addition, the tuning range of the displacement is limited to a few micrometers, which restricts MOEMS devices to the visible or near IR (Vis-NIR) applications. For mid-wavelength IR (MWIR) or LWIR applications, where the tuning range is larger than 2 micrometers, very high voltage (100-200 volts) must be used, which restricts the application. The voltage is too high and needs to be decreased.

There is still a need to develop improved MEMS devices and techniques for leveraging electrostatic forces and causing motion within microengineered devices. Electrostatic forces due to the electric field between electrical charges can generate relatively large forces given the small electrode separations in MEMS devices. Electrostatic devices operable with lower and less erratic operating voltages are needed. Advantageous new devices and applications could be created by leveraging the electrostatic forces in new MEMS structures.

SUMMARY OF THE INVENTION

An embodiment of the present invention provides a stepping actuator that is capable of realizing vertical (to the surface of the substrate) displacements in precise, incremental steps. Each stepping motion is due to the pull-in of a pair of the many sub-actuators in the stepping actuator. The sub-actuators are parallel-plate electrostatic actuators, and they have graduated air gaps that subdivide the full displacement range of the stepping actuator. The actuation is by applying a voltage higher than the pull-in voltages so that their upper, movable electrodes come in contact with the fixed electrodes. This moves the rest of movable electrodes one incremental air gap, reduces the air gaps, lowers the pull-in voltage, and increases the actuating force in a fashion similar to the zipping actuators. More importantly, each step of actuation of the incremental displacement is dependent on incremental step height of the fixed electrodes only, not on the spring constants or mechanical properties of the material. This allows precision positioning that is independent of the exact mechanical properties of the material. This also allows both digital output and input.

A slew of innovative MEMS devices can be made by from utilizing or incorporating the stepping actuator. They are referred to as stepping actuator devices hereon. They can be operated in digital fashion, using a single voltage slightly higher than the pull-in voltage. Additionally, a method is also provided for fabricating and packaging the stepping actuator devices. It uses surface micromachining technique to fabricate and packaging the stepping actuator devices from single-crystal silicon, which is essential to high precision and stress-free microstructures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
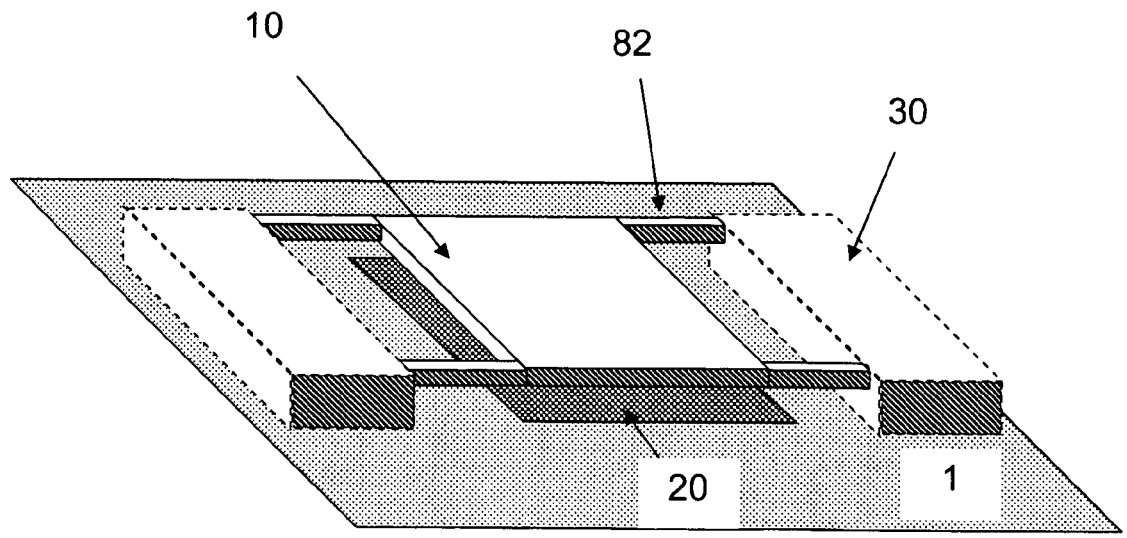
FIG. 1 is a perspective view of a conventional parallel-plate electrostatic actuator.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
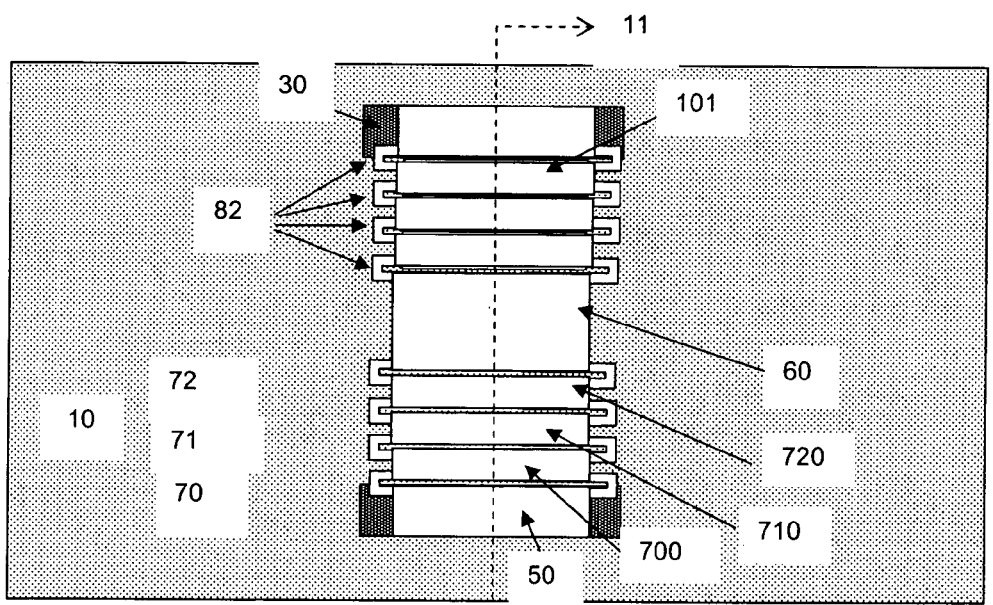
FIG. 2 is a plain view of a MEMS stepping actuator according to a first embodiment of the present invention.
Figure 3:
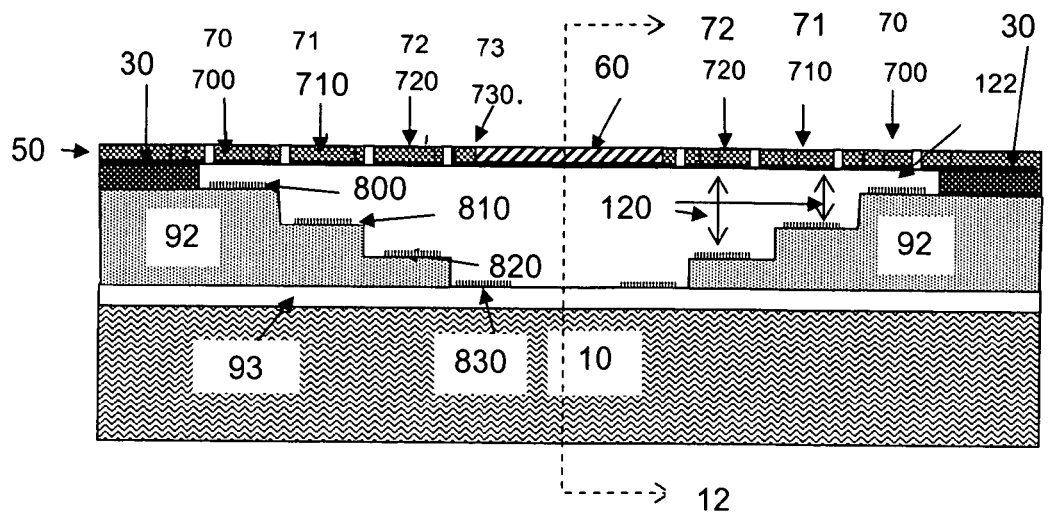
FIG. 3 and FIG. 3A are cross-sectional views of the MEMS stepping actuator shown in FIG. 2.
Figure 3A:
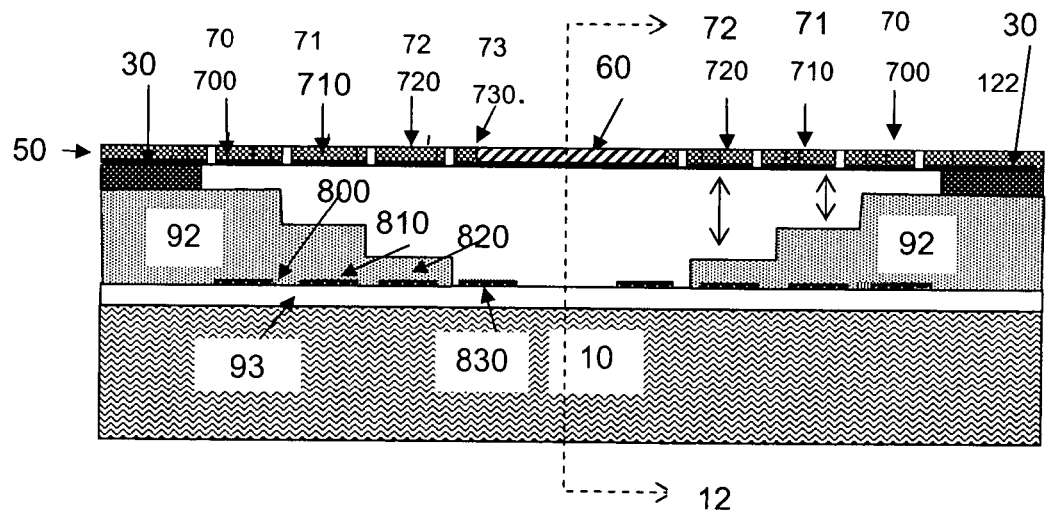
Figure 4:
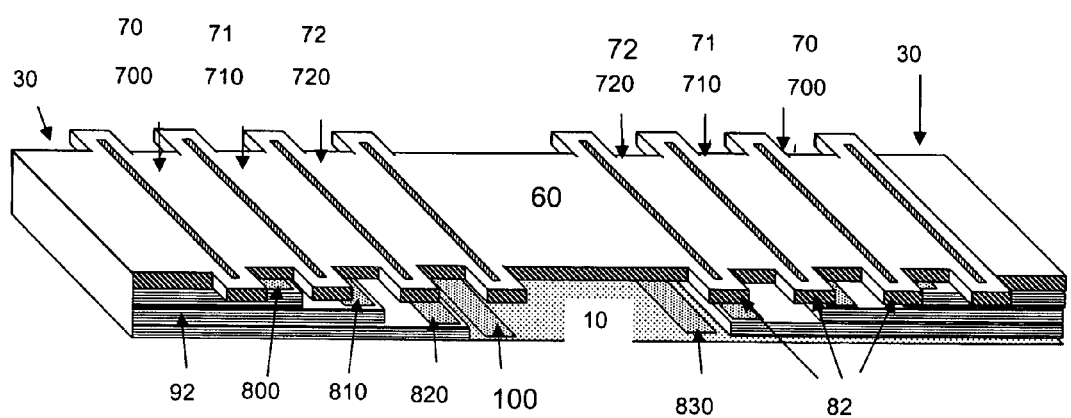
FIG. 4 is a perspective view of the MEMS stepping actuator shown in FIG. 2 and FIG. 3.

Referring to a plain view in FIG. 2, a cross-sectional view in FIG. 3, and a perspective view in FIG. 4, the present invention provides a MEMS device comprising an electrostatic stepping actuator having low operating voltage, large force, large stroke range, and accurate displacement. In the first embodiment, the stepping actuator comprises a substrate 10, which further comprises individual dies of microelectronics, stair-shaped insulators 92 with separate fixed electrodes 800, 810, 820, 830 on their steps, overlay insulator 850 (over the fixed electrodes, not shown), and a suspended membrane 50 comprising movable electrodes 700, 710, 720, 730 payload platform 60, a plurality of spring hinges 82 and pillars 30. The purpose of the overlay insulator is to keep the movable electrodes from coming in electrical contact with the fixed electrodes upon pull-in. Alternatively, a underlying insulator is formed in the movable electrode to serve the same purpose. Although not shown, these overlying or underlying insulators are implied in all of the Figures herein, unless specified otherwise. Thickness of this overlay insulator may vary from one fixed electrode to another as shown FIG. 3A. The fact that the dielectric constant of the overlay insulator may be substantially different from that of air or vacuum must be taken into account when calculating the pull-in voltages or electrostatic forces for any given air gap. The spring hinges 82 may comprise meandering, cantilever, bending and/or torsion beams. These components are symmetrically formed or distributed with respect to an invisible central line 11. Thus the fixed electrodes, movable electrodes, stair-shaped insulators, and pillars are formed in pairs. A perspective view of the stepping actuator device of FIG. 3 is shown in FIG. 4. The fixed electrodes 800, 810, 820 are placed on the stair steps of the stair insulators 92, while fixed electrodes 830 are on the substrate 10. These fixed electrodes are called stepped electrodes because they are at different heights from the substrate 10. Thus the movable electrodes can stop at the different heights (from the substrate surface).

Figures 4A, 4B:
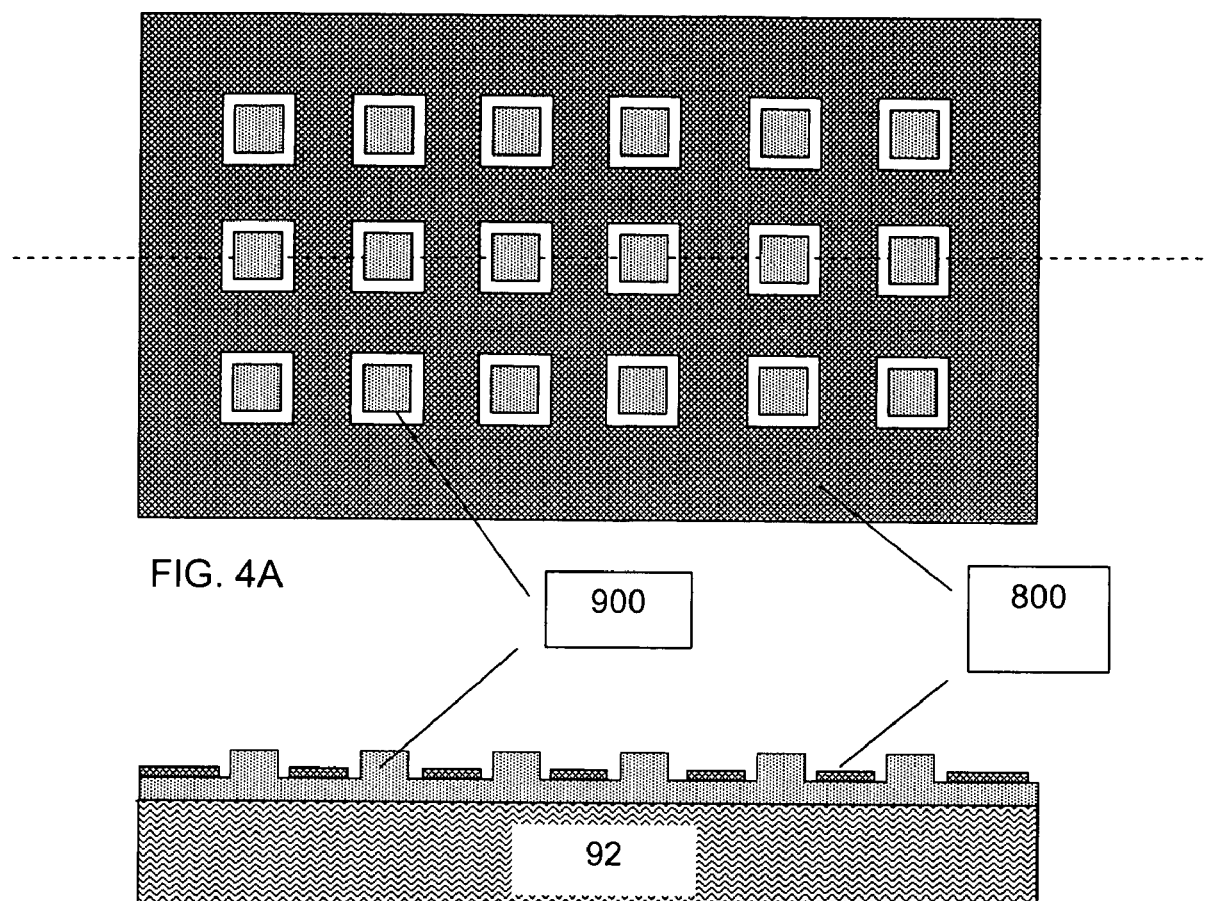
FIG. 4A is a plain view of insulator islands surrounded by a matrix of fixed electrode.
FIG. 4B is a cross-sectional view of insulator islands in a matrix of fixed electrode FIG. 4A.

The suspended membrane 50 is generally planar. It comprises a medial payload platform 60, two sets of movable electrodes 700, 710, and 720, and spring hinges 82, wherein spring hinges 82 interlink the movable electrodes 700, 710, 720 and the central payload 60. The three movable electrodes 700, 710, 720, 730 and the fixed electrodes 800, 810, 820, 830 are paired to form parallel-plate electrostatic sub-actuators 70, 71, 72, and 73 on both sides of payload platform 60. The air gaps of the parallel-plate electrostatic sub-actuators 70, 71, 72 and 73 are determined by the height of the fixed electrodes. They are preferably, but not necessarily, of equal increments, i.e., $g_o$, $2g_o$, $3g_o$, and $4g_o$ respectively, in the exemplary stepping actuator. The lowest numbered sub-actuators 70, which are closest to the pillars 30, have the smallest air gap $g_o$; the next sub-actuators 71 have twice the air gap $2g_o$, and the third sub-actuators 72 have air gap $3g_o$, and so on for any subsequent sub-actuators. Further, the fixed electrodes of the sub-actuators may comprise an overlying insulator layer for preventing direct electrical contact between the fixed electrodes and the movable electrodes during pull-in. This overlying insulator layer tends to suffer from "charging", in which fixed charges are induced therein due to the high electric field from the two electrodes being biased. A way of reducing the amount of charging is to forming an array of bumps of insulator in a matrix of metal layer. A preferred embodiment is shown in plain view of FIG. 4A cross-sectional view of FIG. 4B, wherein the fixed electrode 800 is reticulated and bumps of insulator 900 are formed in a network or matrix of fixed electrode 800, wherein the height of insulator bumps is higher than the fixed electrode and the fixed electrode and the insulator islands are underlapped, as shown in plain view of FIG. 4A and cross-sectional view of FIG. 4B. This configuration reduces charging in the insulator bumps because the leakage current has to flow laterally across the gap where the lateral electric field is small. This matrix configuration can be formed with a self-aligned process with only one mask with existing art.

Figure 5:
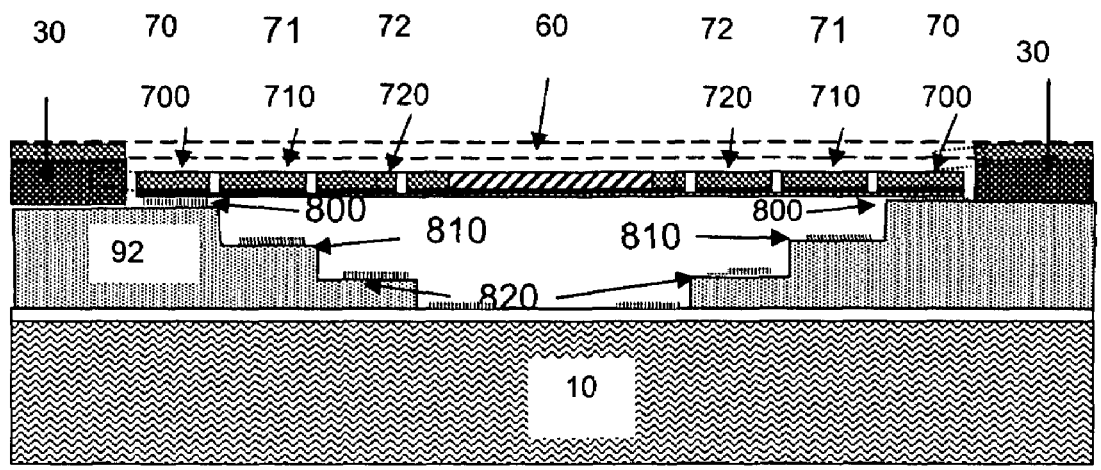
FIG. 5 is a cross-sectional view of the MEMS stepping actuator embodiment in FIG. 2 wherein the first pair of sub-actuators is actuated to move the payload platform 60 downward one step.
Figure 6:
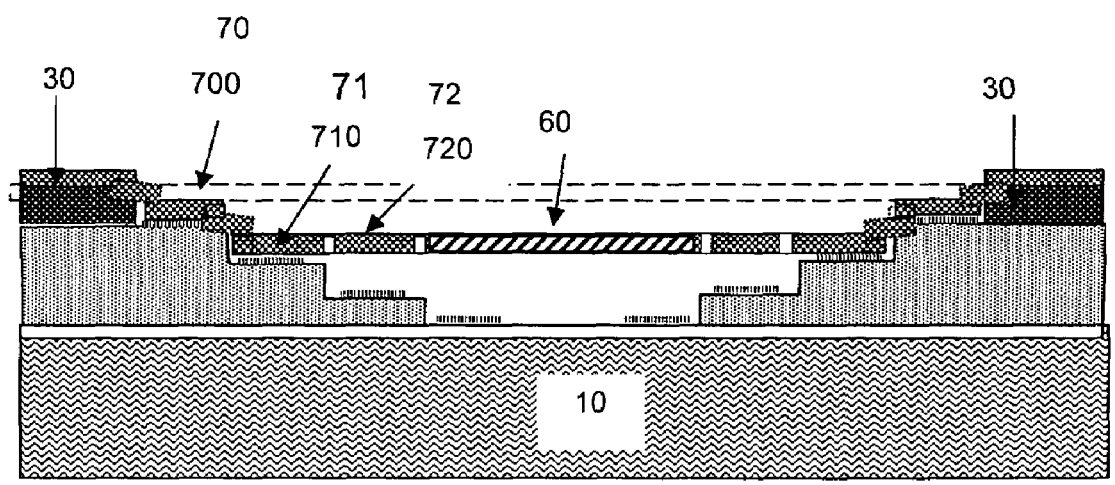
FIG. 6 is a cross-sectional view of the MEMS stepping actuator embodiment in FIG. 2 wherein the first and the second sub-actuators are actuated to move the payload platform one step further downward from its position in FIG. 5.

It can be seen that one of the main purposes of having stairs different heights in the overlay insulators and/or fixed electrodes is to stop the movable electrodes at different preset heights upon pull-in. Other methods to accomplish this include having different thickness in the fixed electrodes or the overlying insulator. It is also noted that three sub-actuators or displacement steps depicted in this first embodiment are for illustration purposes, the number of sub-actuators or the displacement steps may vary from application to application. Although the spring hinges 82 shown in FIG. 4 have the same thickness as the suspended membrane 50 and shape like a flexure, they may assume a different thickness and shape if needed. Additionally, the suspended membrane may comprise metal coatings on topside or underside for reducing the electrical resistance. In this first embodiment of stepping actuator, a preferred method of operation is to sequentially pull in, or actuate, sub-actuators 70, 71, and 72, in the order of the smallest numbered actuator to the large numbered ones. It is noted that pairs of sub-actuators of the same air gap on both side of the payload platform are actuated together, and the terms "pull in" and "actuate", "pull-in" and "actuation" have the same meaning hereafter. The actuation of a sub-actuator is preferably done by applying a voltage between the movable electrode and the fixed electrode exceeding the pull-in voltage of the sub-actuator. Referring to FIG. 5, wherein movable electrodes 700 of the sub-actuator pair 70 of the stepping actuator are pulled in. The pull-in voltage $V_{PI}$ for the sub-actuators 70, given by EQ. 2, is much lower than a conventional electrostatic actuator with the same overall air gap ($3g_o$); only $\frac{1}{3}^{3/2}$ (19%) of the latter. It can be seen in FIG. 5 that after the sub-actuator pair 70 is actuated, the rest of the movable membrane 50, including movable electrodes 710, 720 and payload platform 60, is moved closer to the substrate 10 and the fixed electrodes 810, 820, 830 by a distance of $g_o$. That is, the air gap of sub-actuators 71 decreases from $2g_o$ to $g_o$, and the payload platform is moved an incremental distance of $g_o$. Now the stepping actuator is ready to move the payload platform another step, and the actuation voltage of the sub-actuators 71 is governed by the new air gap of $g_o$ instead of $2g_o$. Thus the actuation voltage remains the same as that of sub-actuators 70. When sub-actuators 71 are actuated, as shown in FIG. 6, the rest of movable electrodes 720 and the payload platform are again moved a distance of $g_o$ closer to the fixed electrodes 820 and the substrate 10. Thus by the same token, the air gap for the sub-actuators 72 decreases to $g_o$ and the actuation voltage becomes that corresponds to $g_o$ accordingly.

Now it can be seen that the stepping actuator is operated by actuating the sub-actuators in a proper sequence, thereby keeps the actuation voltages of each step substantially the same and at a low value. It can operate in digital fashion as the displacement is not sensitive to the exact applied voltage, but a threshold voltage. Thus the present stepping actuator has the following characteristics: (1) Consists of a plurality of parallel-plate electrostatic actuators with distinct air gaps; (2) Inputs are in digital format or on-off fashion; (3) Movement of payload is in discrete steps; (4) Actuation voltage is low; (5) Output force is large; (6) Amount of displacement is fixed or etched in the actuator; and (7) Displacement is normal to the substrate. While the exemplary stepping actuator given herein comprises only 3 to 4 sub-actuators and steps, substantially more of them can be implemented.

Although the stepping actuator described herein is designed to operate in digital fashion, it can operate in analog fashion. Referring to FIG. 3, an analog voltage signal applied on sub-actuators 72, which has an air gap of $3g_o$, is capable of controlling the displacement of the movable electrodes 720 and the payload platform between 0 to $g_o$ without exceeding the ⅓ air gap limit. For controlling the displacement of the payload platform between $g_o$ and $2g_o$, sub-actuator 70 is actuated to pull-in and analog signal is applied to sub-actuator 73, which now has a zero-state air gap of $3g_o$. Thus the stepping actuator's analog range is $2g_o$, in contrast to $1.33g_o$ for a typical electrostatic actuator having an air gap of $4g_o$. Note in this mode of operation, more than one sub-actuator may be utilized at one time for optimizing the present analog operation. Of course the sub-actuators, if not being actuated, may be used as feedback capacitor for closed-loop operations in controlling the payload platform position, which is measured by measuring and controlling the capacitance of the feedback capacitor.

The analog mode of operation of the present stepping actuator embodiment can be employed during the digital operation, for fine adjustment of the air gap. For example, in the first state of actuation in FIG. 5, where the first sub-actuators 70 are actuated, sub-actuators 71 or 72 can be used to generate a small amount of displacement of the movable electrodes 710 along with the payload platform. This is accomplished by applying an analog voltage signal on sub-actuators 71 or 72. This fine adjustment or control can be used to set a more exact position for the payload platform during the digital operation.

Figure 7A:
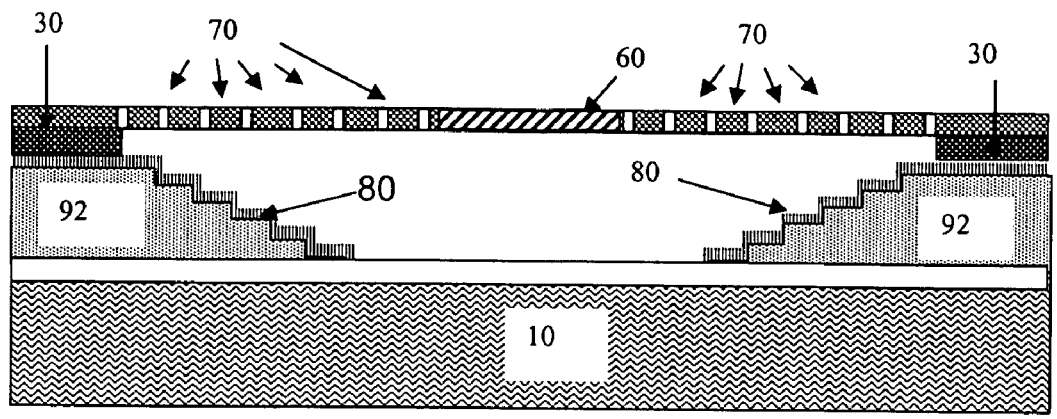
FIG. 7A is a cross-sectional view of a MEMS stepping actuator according to another embodiment.
Figure 7B:
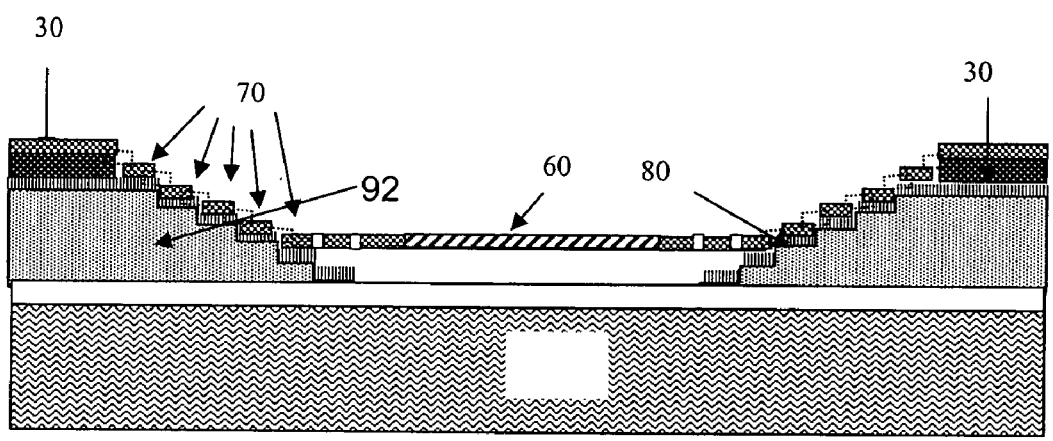
FIG. 7B is a cross-sectional view of the MEMS stepping actuator embodiment of FIG. 7A wherein a voltage has been applied to move the payload platform 60 five steps downward.
Figure 8:
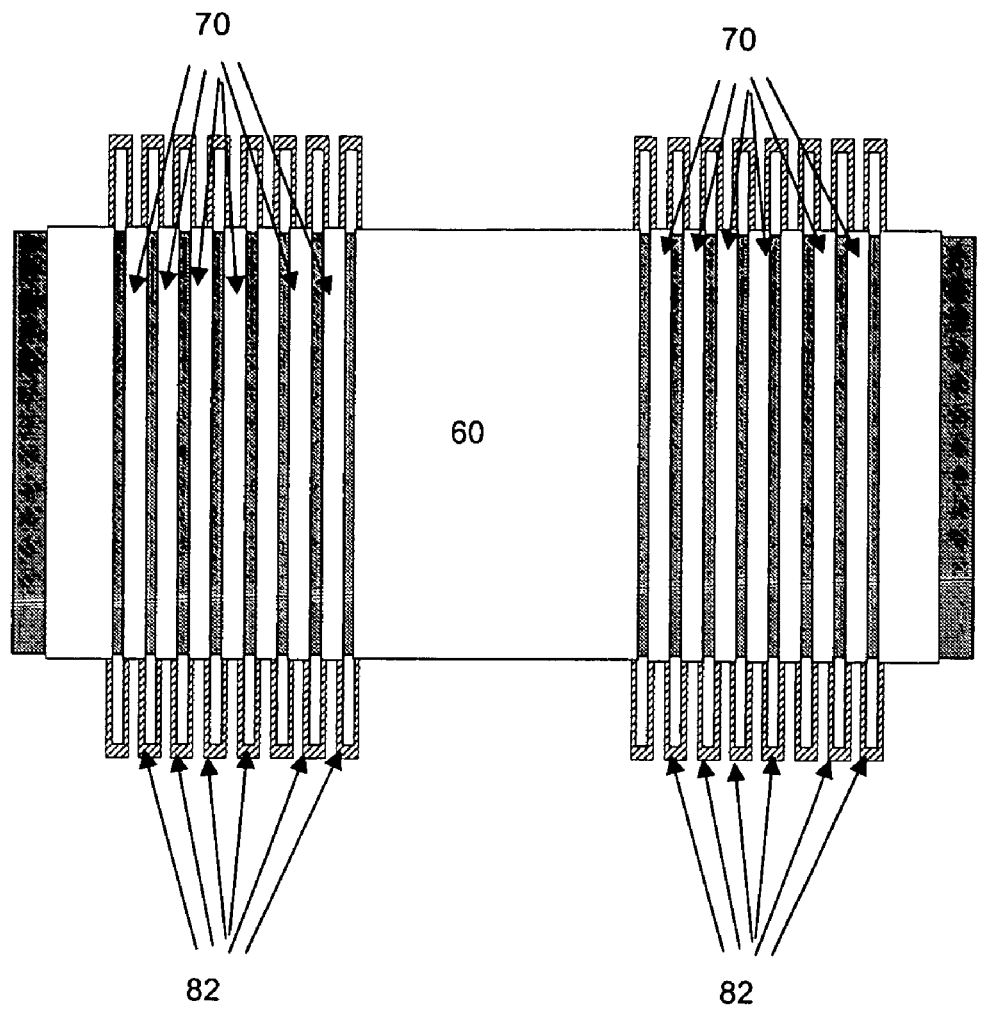
FIG. 8 is a plain of the MEMS stepping actuator embodiment in FIG. 7A.

In another preferred embodiment of the stepping actuator, all the fixed electrodes 80 on a stair insulator are continuous, or electrically connected together, as shown in FIG. 7A. Then when a voltage exceeding the actuation voltages of all the sub-actuators is applied between the movable electrodes and fixed electrodes, the payload platform will be brought in contact with the substrate. This embodiment can be used to substantially lower pull-in voltage of RF MEMS switches of capacitive type or contact type described in the literatures (e.g. RF MEMS—Theory, Design, and Technology, authored by Gabriel M. Rebeiz, published by Wiley Interscience, a John Wiley & Sons, 2003), wherein the payload platform comprises the movable capacitive plate or the electrical contact, while the substrate comprises the fixed capacitive plate (with an overlay insulator) or the electrical contact as part of the capacitive or contact RF MEMS switches, respectively. Incidentally, the contact RF MEMS switch can also be used as a switch for DC. They can be switched on and off by actuating the sub-actuators to bring the movable capacitive plate or the electrical contract into contract with their counterparts on the substrate. In another continuous-fixed-electrode embodiment of the stepping actuator, sub-actuators 70 have increasing actuation voltages from pillar ends to the medial payload platform 60. This systematic increase in actuation voltages can be implemented by slight modification of the sub-actuators, such as spring constants of the individual spring hinges. FIG. 7B shows five of the six sub-actuators 70 are actuated by applying between the fixed electrodes 80 and the movable electrodes with a voltage that is higher than the fifth sub-actuators' actuation voltage, but lower than the sixth's. This constitutes discrete operation that contains both analog and digital aspects. FIG. 8 is plain of the stepping actuator in FIG. 7A and FIG. 7B, showing the movable electrodes of the six sub-actuators with spring hinges 82. This embodiment of the stepping actuator device requires only one or two interconnection, which may be simpler than the digital embodiment connections, especially when a large number of sub-actuators are used. In this embodiment, the input voltage is analog, but the output stepping movement is the same as that in the digital stepping actuator, in discrete steps formed in the stair insulator. It should be noted that there are secondary effects. Firstly, tension may be introduced in the suspended membrane 50 when being pulled down and result in an increase in the actuation voltages. Secondly, the voltage applied on the fixed electrodes can introduce an attractive force on the movable electrode to lower the actuation voltage of the sub-actuators. Furthermore, a load placed on the payload platform may also alter the actuation voltage. These effects should be taken into account when designing the actuator.

Figure 9:
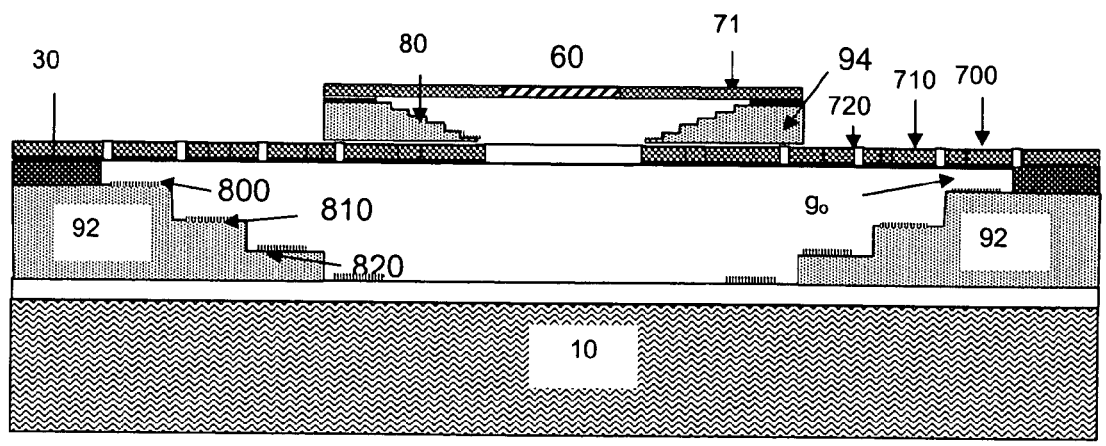
FIG. 9 is a cross-sectional view of a stepping actuator of a two-level embodiment.

In yet another embodiment, two stepping actuators are stacked on top of each other wherein payload platform of one stepping actuator is substrate of the other as shown schematically in FIG. 9. In this embodiment, the number of displacement steps of the upper stepping actuator is multiplied by the number of steps in the lower stepping actuator. The number of different displacements may be smaller, however, if degeneracy take place. Degeneracy refers to repetitions, i.e., same amount of displacement for different state of actuation. The lower level stepping actuator in FIG. 9 comprises four sub-actuators having incremental height of $g_o$ in the fixed electrodes, and the upper level stepping actuator comprises five sub-actuators with incremental height of ⅕ $g_o$ in the fixed electrodes. Then the total number of vertical positions the payload platform can assume is 20 (4 times 5). Alternatively, the first (top) step of each actuator may be used for staging, which can reduce the number of steps by one in both stepping actuators. Then the total number of vertical positions the payload platform can assume is 12 (3 times 4). The staging step is used as "tensioner" that prevents or removes sagging of the suspended flexible membrane (50 in FIG. 3). The sagging may be caused by bowing of the membrane due to device fabrication or mismatch in thermal expansion coefficient between the membrane and the substrate. Needless to say, the two-level design can be expanded to multi-level design to further increase the number of displacements.

The suspended membrane, which comprises the movable electrodes, in the stepping actuator and devices described thus far are substantially planar and the difference in the air gaps among the parallel-plate electrostatic sub-actuators are due to the difference in height in the fixed electrodes. However, it is conceivable that the difference in air gaps is in the movable electrodes instead.

Figure 10:
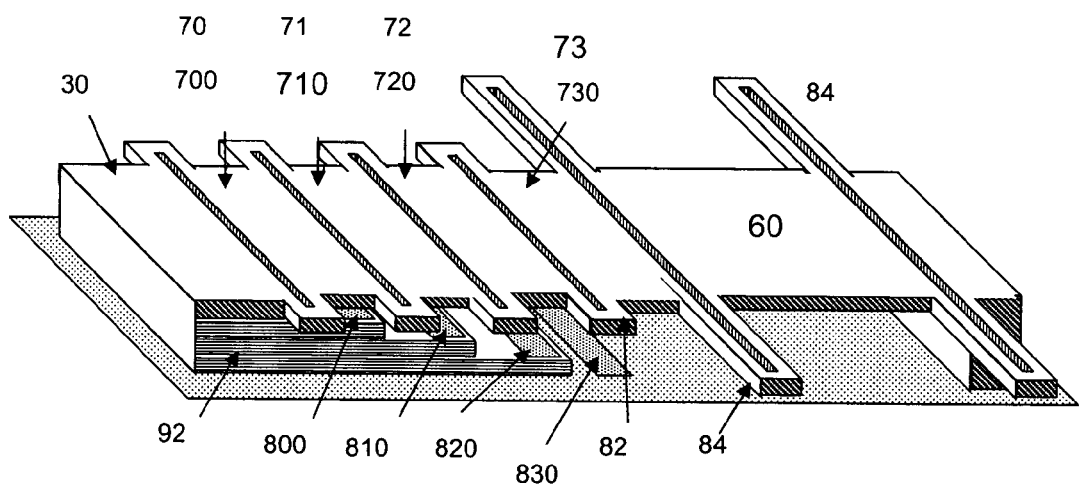
FIG. 10 is a perspective view of a MEMS digital tilt actuator.
Figure 11A:
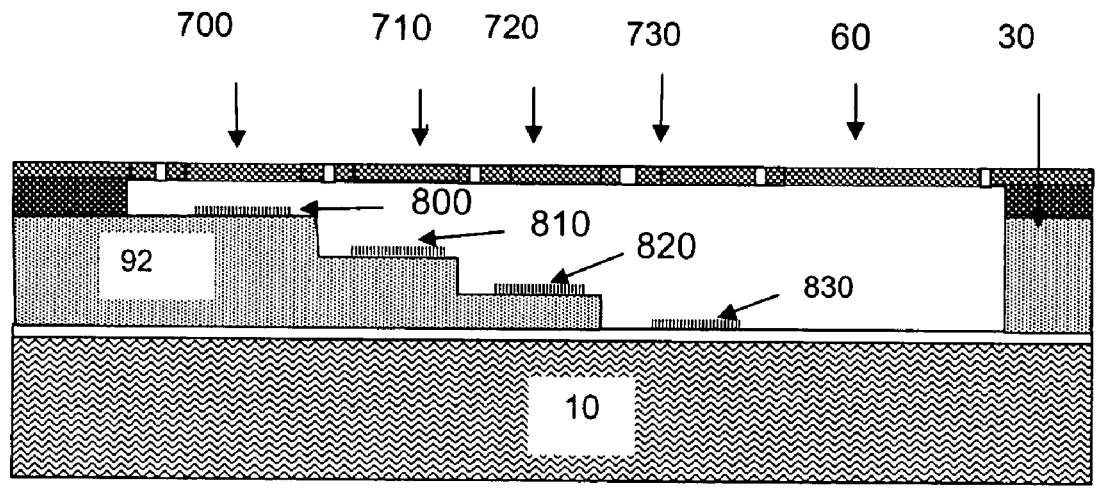
FIG. 11A to FIG. 11D are cross-sectional views of the digital tilt actuator of FIG. 10 at different stages of actuation, wherein one or more individual sub-actuators are actuated to create different degrees of tilt on the payload platform.
Figure 11B:
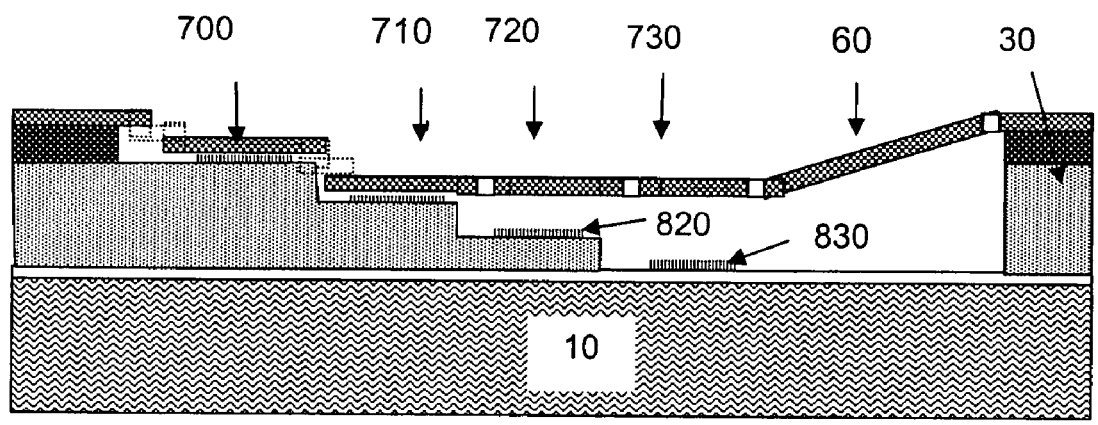
Figure 11C:
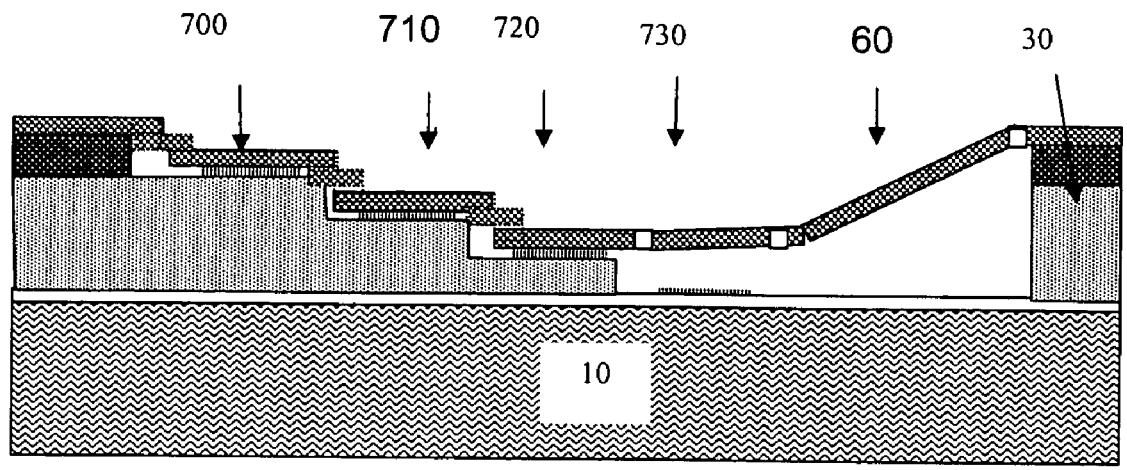
Figure 11D:
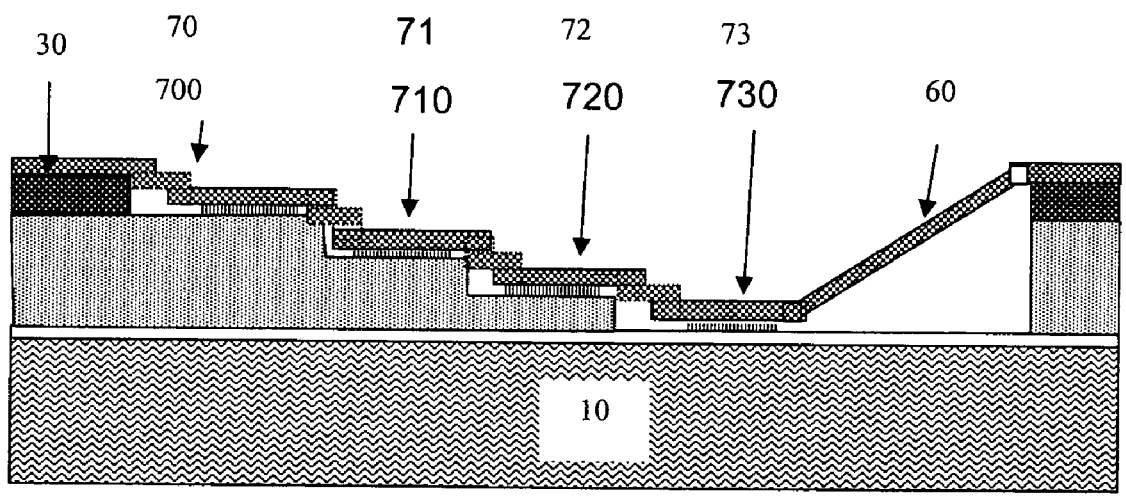
Figure 12:
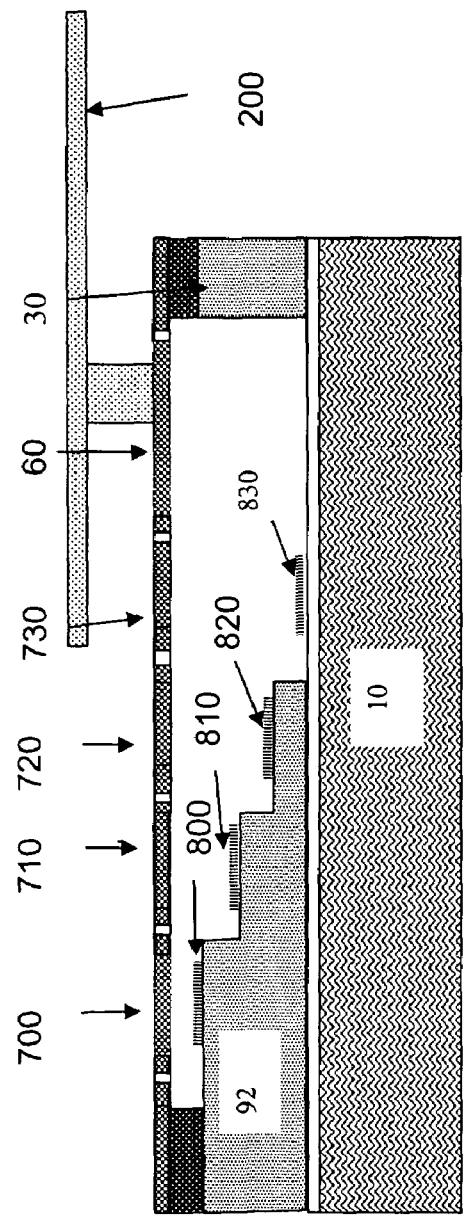
FIG. 12A is a cross-sectional view of a tilting mirror device from the digital tilt actuator in FIG. 10 with a mirror mounted on its payload platform.
FIG. 12B is a cross-sectional view of the tilting mirror device having all its sub-actuators actuated and the mirror fully tilted.
Figure 12A:
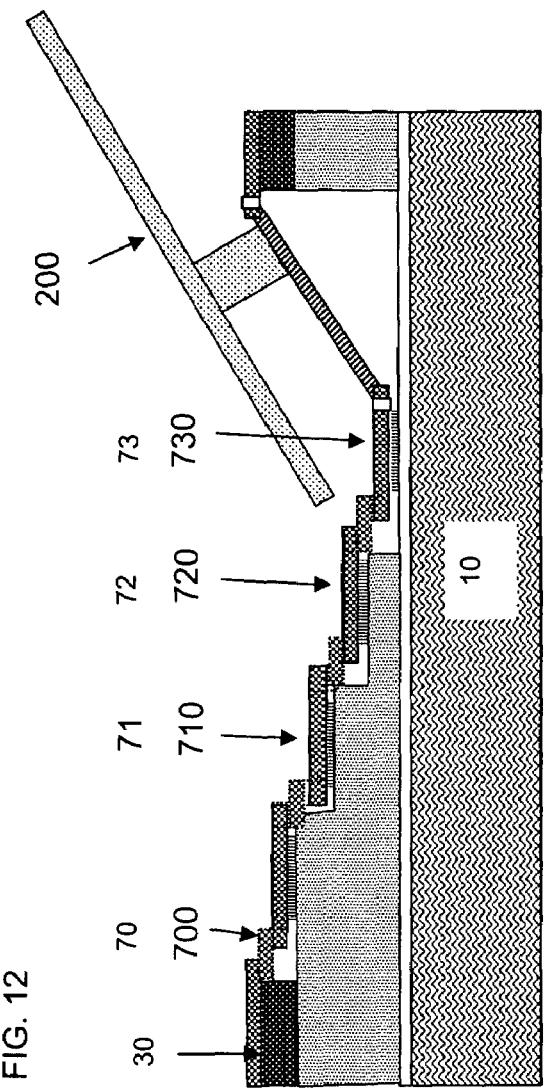
Figure 13:
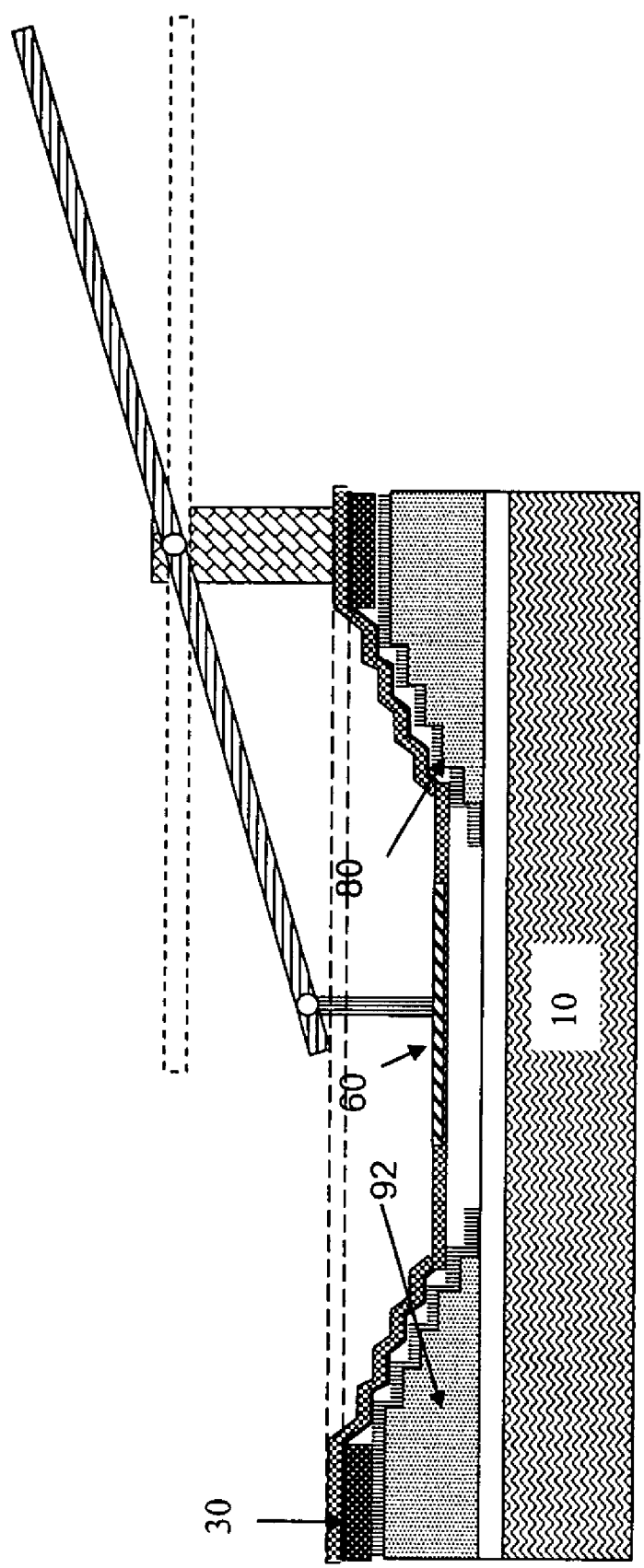
FIG. 13 is a cross-sectional view of another tilt mirror device embodiment having all the sub-actuators actuated and the mirror fully tilted.

The sub-actuators in the stepping actuator devices described thus far are symmetric with respect a medial plane, or the dashed lines 11 and 12 in FIG. 2, FIG. 3 and FIG. 3A, respectively. This symmetric type is used provide out-of-plane force or displacement. However, a non-symmetric, one-sided cantilever configuration that has sub-actuators only on one-side, which is equivalent to the left or right half of the device shown in FIG. 3 or the one shown in FIG. 10 may be construed. Referring to cross-sectional view in FIG. 11A, movable electrodes 700, 710, 720, 730 and fixed electrodes 800, 810, 820, 830 form four sub-actuators linked to each other with spring hinges 82. Payload platform, which is on the right-hand side of the sub-actuators, is linked to sub-actuator 730 and pillar 30 with spring hinges 82, respectively. Spring hinges 82 have substantially lower spring constants, or are substantially softer, than spring hinges 82. Referring to FIG. 11B, when movable electrodes 700 and 710 are "actuated", 720 and 730 are pulled in to lower one end of the payload platform 60 while the other end is fixed. Thereby the payload platform is tilted. FIG. 11C and FIG. 11D show the next two stages of actuation when movable electrodes 720 and 730 are actuated to tilting the payload platform to two new angles in sequence. Therefore this non-symmetric stepping actuator is capable of providing payload platform 60 four distinct tilt angles. This stepping actuator can be called digital tilt actuator. One apparent application for such an actuator is tilting mirror for optical switch. A preferred tilting mirror embodiment is shown in FIG. 12A, wherein the payload platform comprises a mirror 200. FIG. 12A shows the payload platform is tilted to the full extent, when all the sub-actuators are actuated. Such a mirror can steer an incident light beam to four distinctive directions. Again this tilting mirror is for illustration purposes, the number of states can be easily expanded with proper design of the stepping actuator. FIG. 13 shows another embodiment of tilting mirror device comprising a mirror 200 hinged on substrate 10 and a pole that connects one side of the mirror to the payload platform of a stepping actuator, which the sub-actuators can be actuated to tilt the mirror 200.

One application of the stepping actuator devices described herein is a varactor (variable capacitor) used in Radio Frequency (RF) applications. In a preferred embodiment, the actuating device is the symmetric type shown in FIG. 2 and FIG. 3. Its payload platform 60 comprises one capacitive electrode plate of a parallel-plate capacitor and its substrate 10 comprises the other capacitive electrode plate of the capacitor, thereby the parallel-plate capacitor can be driven to take on different capacitance values by actuating its stepping actuator. The number of selectable capacitance values is equal to the number of available pull-in steps in the actuator. The capacitance assumes different values when the gap changes with different states of actuation. The varactor can be used with other RF components to form such RF microwave devices as phase shifters and tunable filters.

Figure 14:
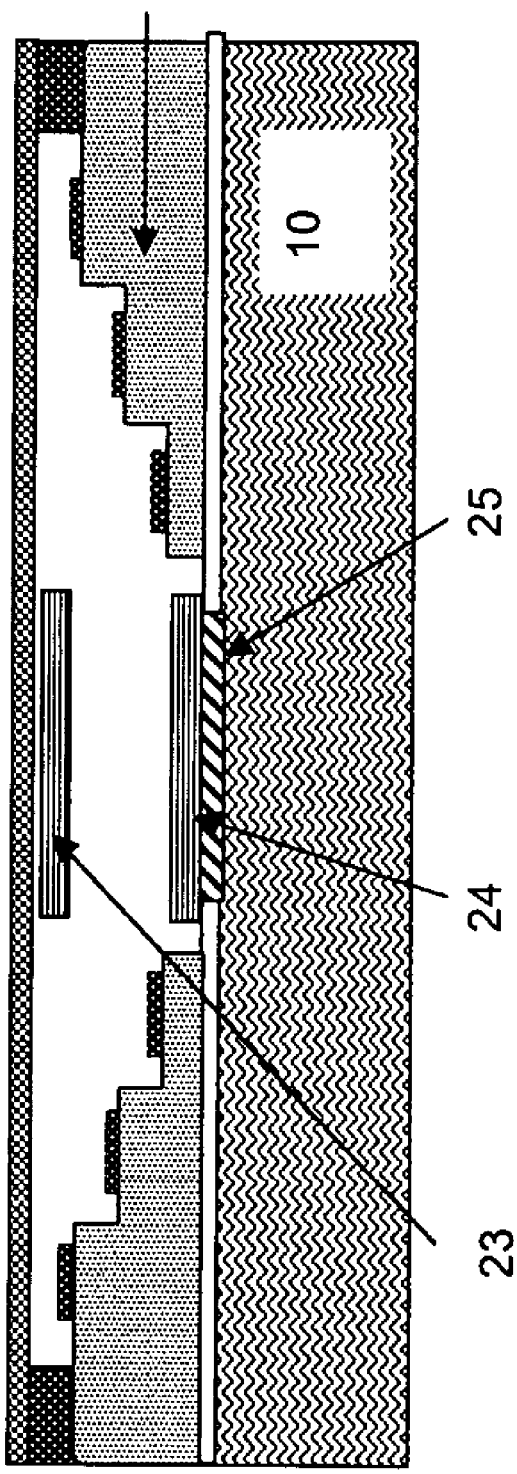
FIG. 14 is a cross-sectional view of a tunable Fabry-Perot utilizing the MEMS stepping actuator shown in FIG. 2.

Another application of the present stepping actuator device is tunable Fabry-Perot filters. A regular Fabry-Perot filter comprises two parallel mirrors having a small, uniform gap in between as described in U.S. Pat. No. 4,859,060. It transmits very narrow spectral band of light depending on the gap, which can be selected by tuning the gap between the two mirrors with an actuator. An exemplary tunable Fabry-Perot filter is shown in FIG. 14, which comprises a stepping actuator with multilayer dielectric and/or metal mirrors 23 and 24 deposited on the payload platform 60 and the substrate 10, respectively. The substrate 10 comprises many dies of photo-detectors or focal plane (detector) array 25 for sensing or imaging. The number of available steps in the stepping actuator dictates the number of pass bands. A similar application device is tunable vertical cavity surface emitting laser (VCSEL), used for wavelength band selection in optical communications as described in U.S. Pat. No. 5,291,502. Referring to FIG. 14 again. This time a microlaser or light emitting diode 25 is incorporated in the substrate 10. One of the mirrors includes at least one reflecting part whose distance from the other reflector can be adjusted to change the effective optical distance between the mirrors and thus tune the optical frequency at which lasing occurs. In another embodiment, one refractive or diffractive optical lens is placed on the payload platform to replace both mirrors. Thus light radiated to or from the substrate 10 can be focused by adjusting its distance to the substrate with the stepping actuator.

Figure 15:
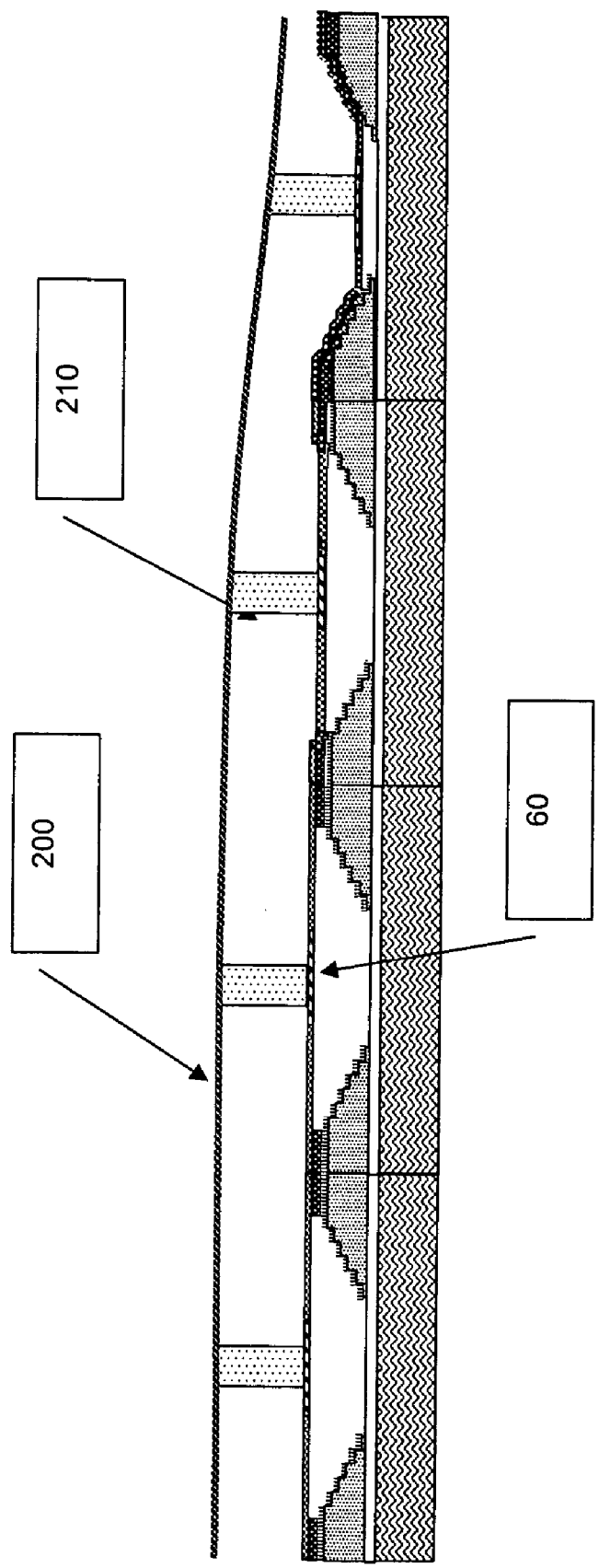
FIG. 15 is a cross-sectional view of a deformable mirror embodiment utilizing an array of MEMS stepping actuators.

Yet another application is MEMS deformable mirror device (DMD) for adaptive optics applications (U.S. Pat. No. 4,679,915). As shown in FIG. 15, it comprises a thin sheet of pliable mirror 200 overlying a 2-D array of the stepping actuator devices, wherein the payload platforms 60 of the stepping actuators have pillars 210 that connect to and support the pliable mirror. The pliable mirror can deform or change its shape by actuating the stepping actuators in the 2-D array. A typical DMD is controlled using analog feedback operations, wherein the feedback is provided by wavefront sensors. In this case the aforementioned analog operation is preferable to digital operation for the stepping actuators.

The above description generally concerns stepping actuator that provides force or displacement in the out-of-plane direction. However, similar principles can be applied in designing an in-plane stepping actuator. A conceptual design is shown schematically in FIGS. 17-20. In a preferred embodiment, both the movable electrodes 700, 710, 720 and fixed electrodes 800, 810, 820 are lateral and are formed from a membrane that is suspended on and in-plane with substrate 10. The lateral fixed electrodes 800, 810, 820 are fixed to the substrate 10 due to their anchors 30 and their inflexible structure. The movable electrodes 700, 710, 720 and payload platform 60 are suspended and movable in the lateral (in-plane) direction and are formed on a thin suspended membrane 50 whose two ends are fixed to the substrate with anchors 30. The movable electrodes and the payload platform are interlinked with spring hinges 82. The suspended membrane and structures formed on it are similar to that of membrane 50 in FIG. 3. Thus the stepping actuator operates in the lateral direction; thus can be called lateral stepping actuator. An advantage of this actuator is it can apply force in either or both opposing directions by placing the fixed electrodes on either or both sides of the movable electrodes. Aforementioned operational schemes such as digital, analog, or mixed operations and applicational devices associated with the aforementioned standard, out-of-plane stepping actuator, including capacitive or contact switches, tunable Fabry-Perot filter, varactor, and tilting mirror, etc. as described earlier is applicable to this in-plane stepping actuator.

Figure 16A:
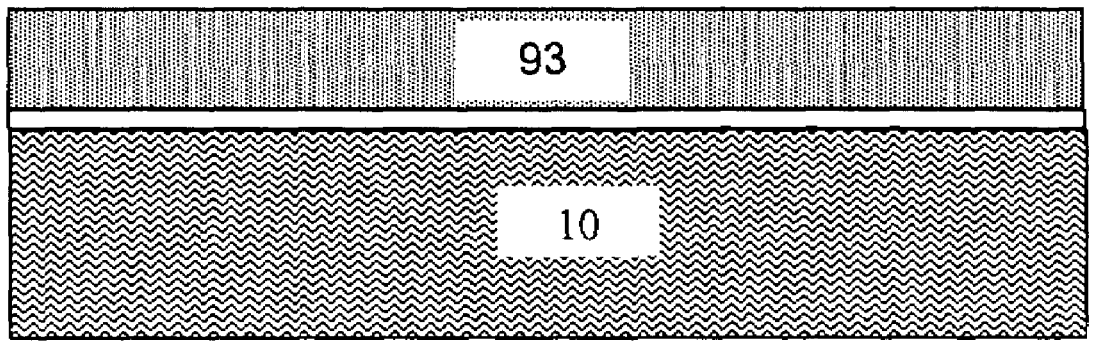
FIG. 16A through FIG. 16I depict cross-sectional side views, showing a particular portion of a microstructure during specific phases of the fabrication process for stepping actuator device.
Figure 16B:
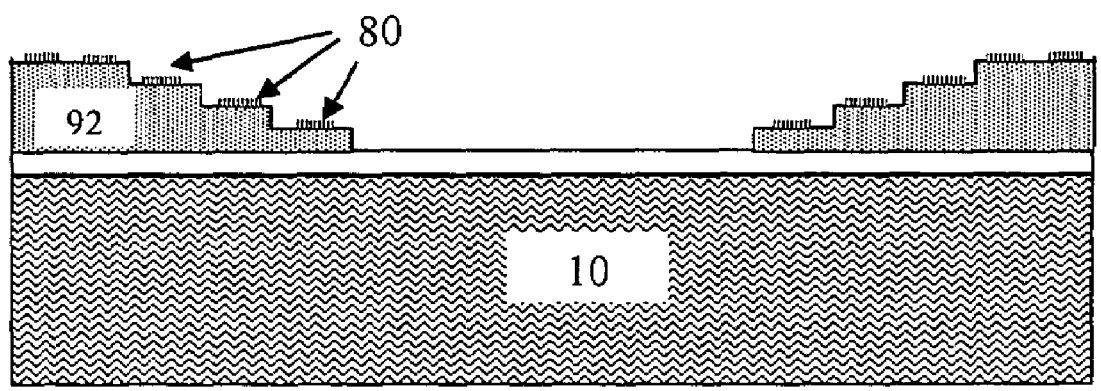
Figure 16C:
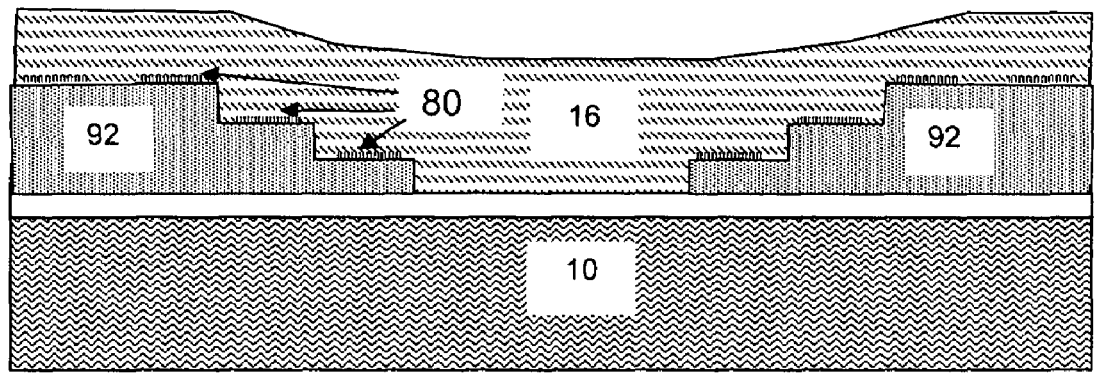
Figure 16D:
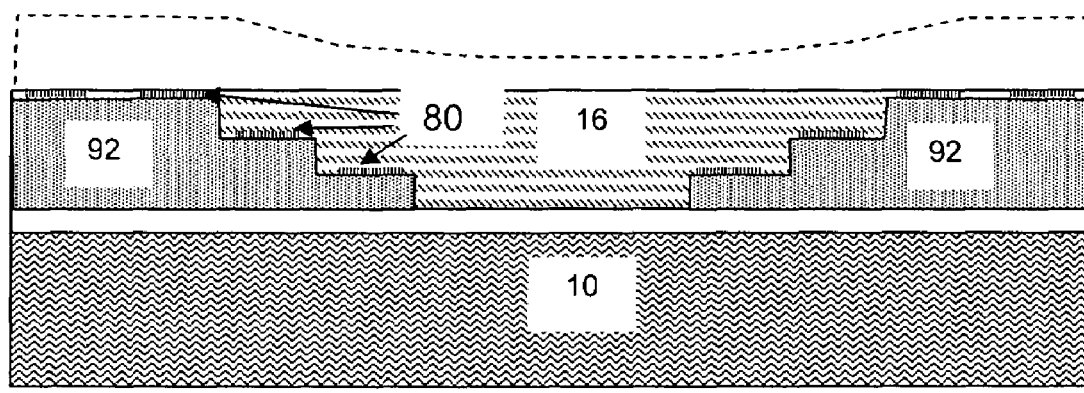

A method and system for manufacturing the above stepping actuator is described herein. The stepping actuator devices are preferably made of single-crystal silicon (SCS), which is free from stress and compatible with the most mature micromachining techniques. Other bulk material such as glass or ceramic, which are free from intrinsic stress, works equally well. A preferred method to fabricate the stepping actuator is similar to that described in U.S. Pat. No. 6,060,336, wherein epoxy or adhesive wafer bonding plays the roles of sacrificial layer and adhesive. Additionally, epoxy is used as a planarization layer, similar to $SiO_2$, in planarizing the surface by a lapping process. Referring now to FIGS. 16A to 16I, there is depicted cross-sectional views showing a particular portion of a microstructure during specific phases of the fabrication process for the stepping actuator device in FIGS. 2 and 3. The dimensions are not shown to scale. FIG. 16A is cross-sectional view of substrate 10 comprising numerous dies of micro-electronic components such as electrodes, integrated circuits, laser, light emitting diode, focal plane array or light detectors, after a thick insulator layer 93 such as $SiO_2$ is deposited. It should be noted that substrate 10 may be planarized prior to the deposition. Cross-sectional view FIG. 16B shows during the next step the thick insulator layer 93 is patterned and etched multiple times to form a pair of stairs 92, and fixed electrodes 80 are formed on the steps of the stairs 92. Thus stepped electrodes are formed. Alternately, the stepped electrodes may be formed by depositing and patterning metal pads or stairs of desired heights. Subsequently a thin insulator is deposited on the stepped electrodes. Metal landing pads 15 may be formed at the same time to provide electrical connection to the ICs on substrate 10. Although only a handful of fixed electrodes 80 are shown in FIG. 16B, substantially more may be formed in the same manner. Next a thick epoxy or adhesive layer 16 is spin cast on the device as shown in FIG. 16C and cured by heat. The resultant epoxy is in general non-uniform in thickness but must be thick enough to rise above the insulator stairs 92 and the electrodes 80. The epoxy layer 16 is subsequently "planarized" by lapping, polishing, and/or turning (on a precision lathe), realizing a smooth, planar surface without affecting the underlying electrodes and insulators as shown in FIG. 16D. Alternately, the planarization layer may be substituted with inorganic dielectrics such as $SiO_2$. The smoothed surface is suitable for subsequent bonding of a membrane wafer 31 or deposition of a thin membrane on the substrate 10. The bonding of the membrane wafer 31 is preferably done by coating another adhesive or epoxy layer 32 on the substrate 10 and/or the membrane wafer 31, bringing them to face each other, and bonding them under pressure and vacuum in a press. The adhesive layer 32, may be patterned to form pillar-like supports prior to bonding. The patterning may be done by a number of techniques such as inkjet printing, screen printing, physical or chemical vapor deposition, photolithography, etching and stenciled deposition. Subsequent thinning of the membrane wafer 31 results in a configuration shown in FIG. 16E. The membrane wafer is preferably a silicon, silicon-on-insulator (SOI), glass, or ceramic wafer, which may comprise electrical elements on the bonding surface for increased electrical conductivity or forming electrodes. The preferred method for coating the adhesive layer is spin cast, which is used in photoresist coating processes. Unlike the common spin cast processes, which go through multiple spin cycles at different speed for 20-30 seconds after dispensing the liquid at center of the wafer, the preferred method for the present epoxy is a single high spin speed cycle for very short time, less than 2 seconds. This yielded better uniformity for the coated epoxy.

Figure 16E:
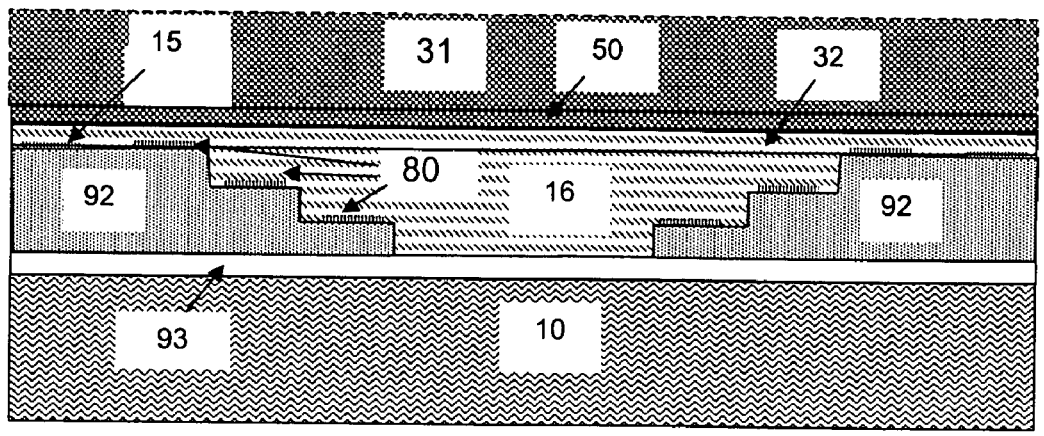

FIG. 16E is cross-sectional view of composite wafer of substrate 10 and membrane wafer 31 after bonding. The membrane wafer 31 was thinned, by lapping, polishing or etching, to a thin membrane 50 with the desired thickness.

Figure 16F:
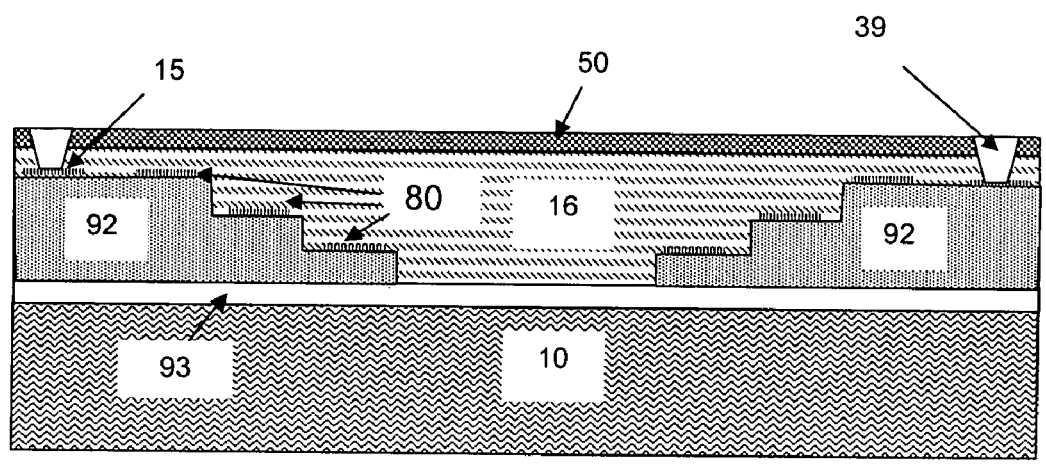
Figure 16G:
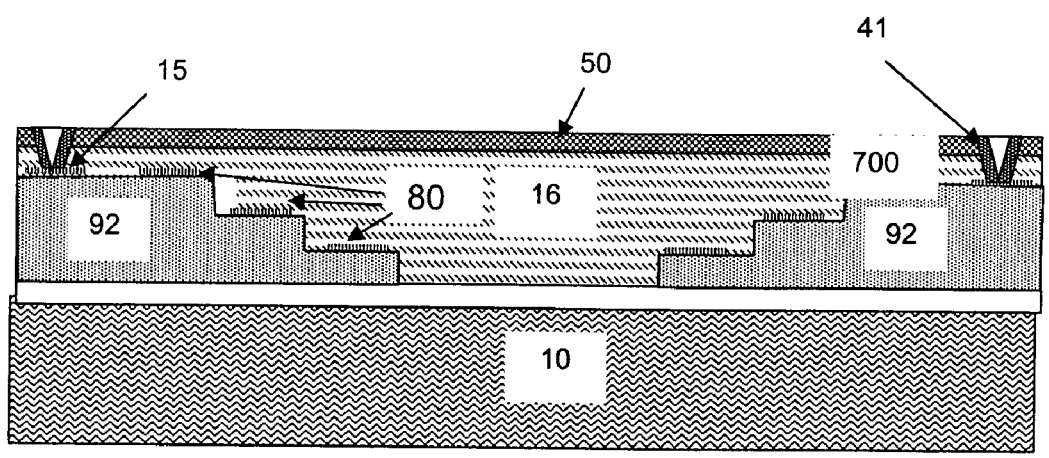
Figure 16H:
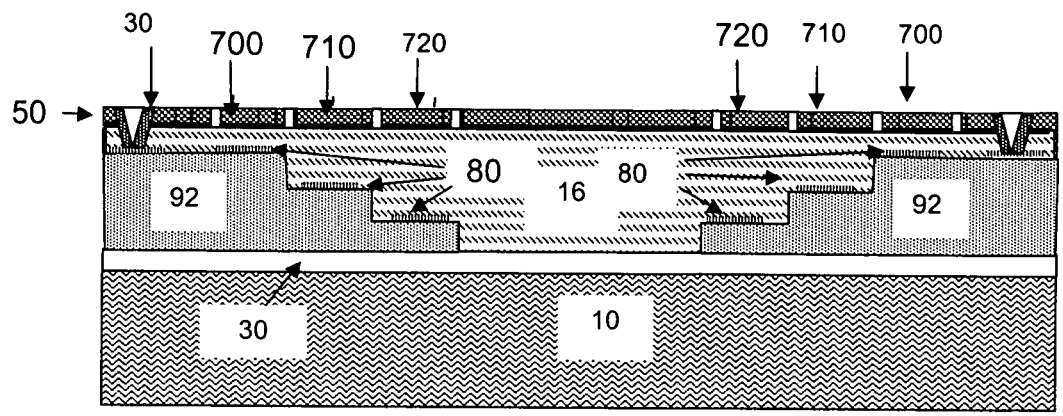
Figure 16I:
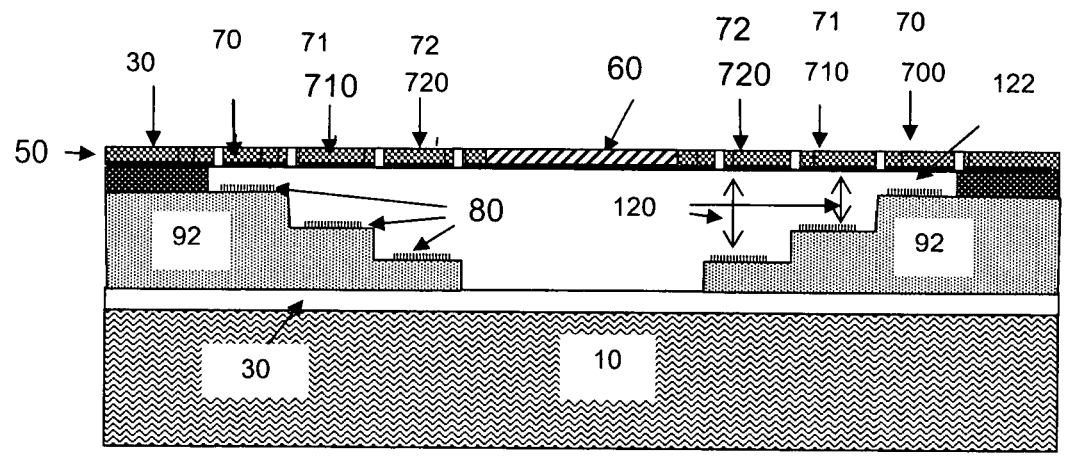
Figure 17:
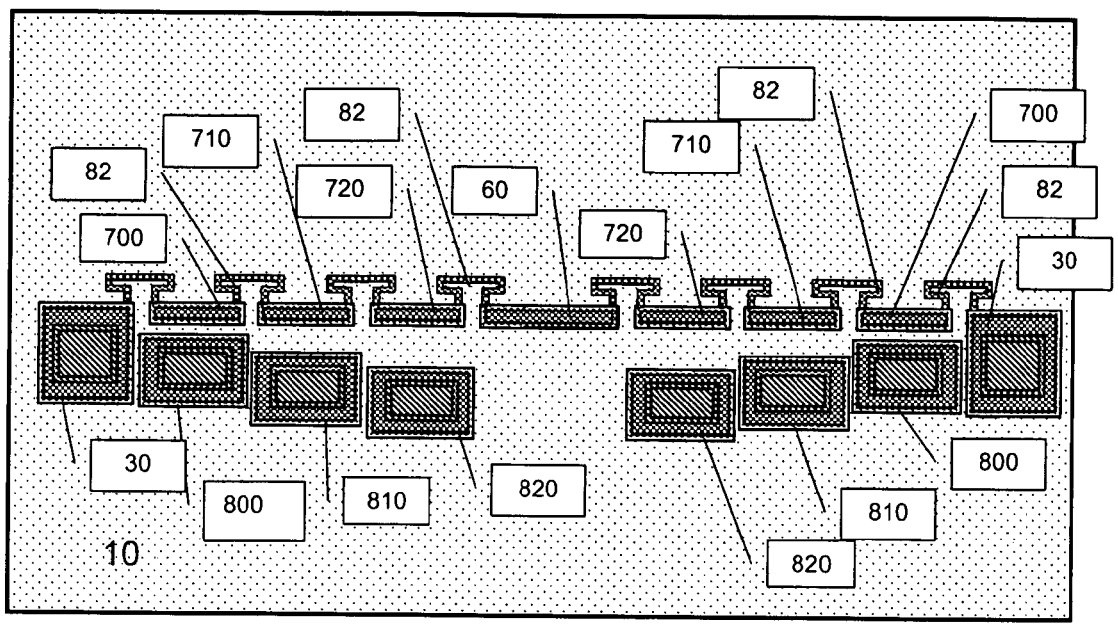
FIG. 17 is a cross-sectional view of a lateral stepping actuator, which is capable of realizing an in-plane displacement.
Figure 18:
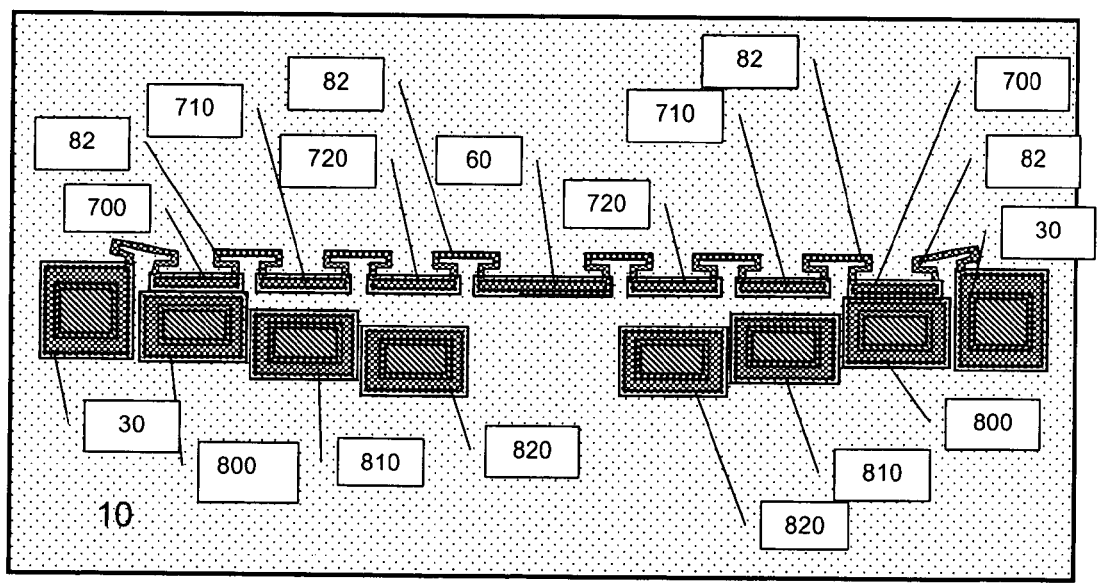
FIG. 18 is a cross-sectional view of the lateral stepping actuator embodiment in FIG. 17 wherein the first sub-actuators 700 are actuated to move the payload platform 60 one step downward.
Figure 19:
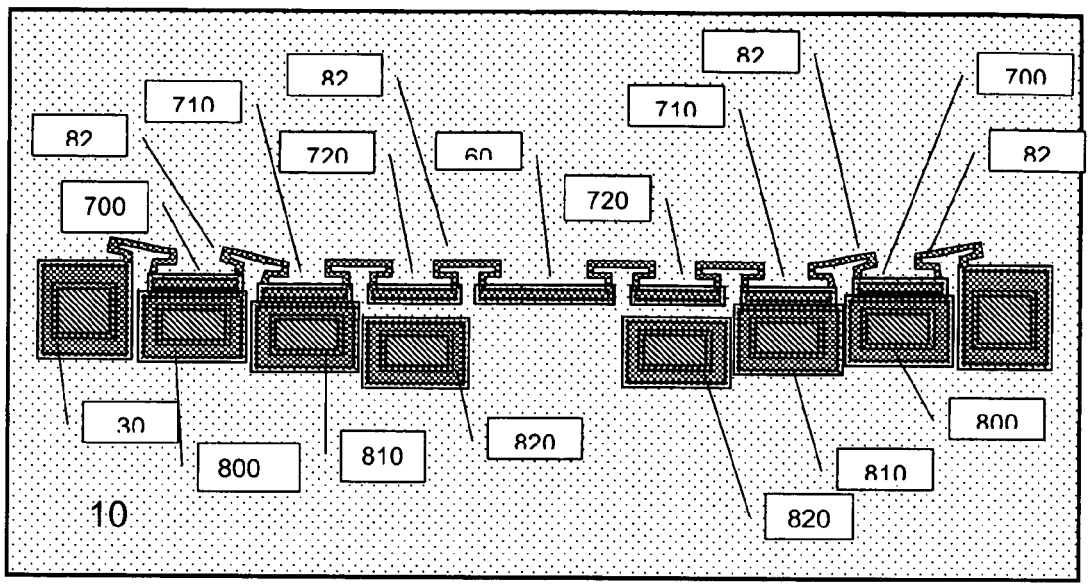
FIG. 19 is a cross-sectional view of the lateral stepping actuator embodiment in FIG. 17 wherein the second sub-actuators 710 are actuated to move the payload platform 60 one step downward.
Figure 20:
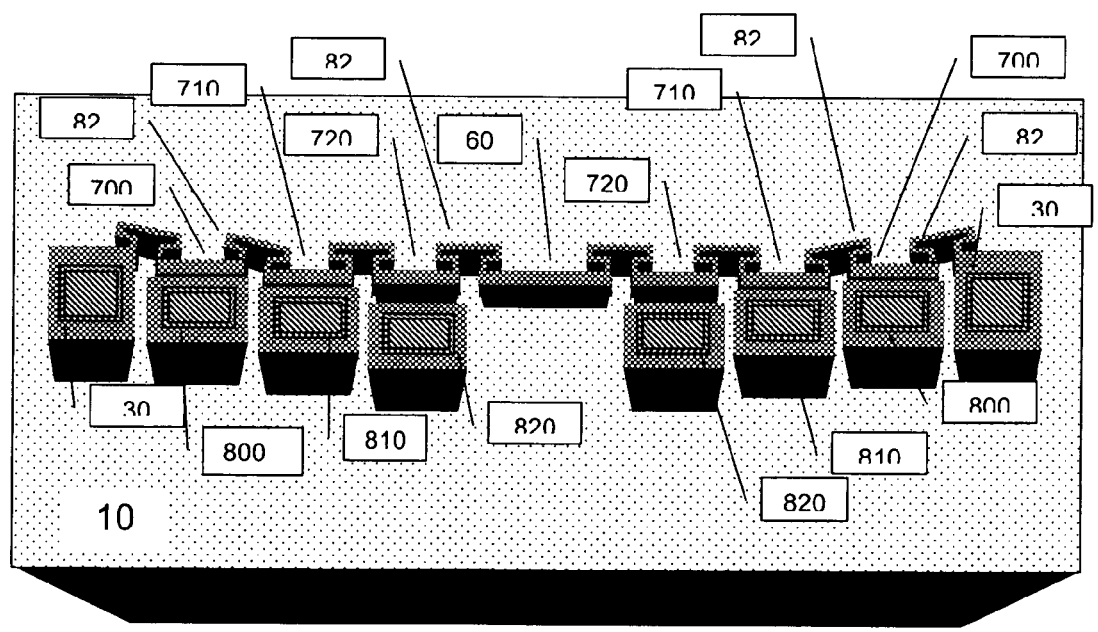
FIG. 20 is a perspective view of the lateral stepping actuator embodiment in FIG. 19.

FIG. 16F is cross-sectional view of the composite wafer after the thinned membrane 50 is patterned with photoresist and etched to form a plurality of via holes 39 through both the membrane 50 and the epoxy layer to the metal landing pads 15. A sloped sidewall profile of the via holes 39 is preferred to facilitate subsequent interconnect metallization. FIG. 16G is cross-sectional view of the composite wafer after deposition of metal layer(s) by sputtering or evaporation that covers the sidewall of the via holes, pattern and etch to form interconnecting pillars 41, which electrically interconnect landing pad 15 with membrane 50 and mechanically support the membrane 50. FIG. 16H is cross-sectional view of the composite after the membrane 50 is patterned and etched to form the various mechanical structures including movable electrodes 700, 710, 720, hinges 82, payload platform 60, and etch access holes. Plain view of such a pattern has been shown in FIG. 2. Next epoxy 16 is etched and undercut through the etch access holes 40 using oxygen-containing gas mixture in a plasma etch reactor to free the suspended membrane 50. FIG. 16I is cross-sectional view of the thinned composite wafer after the epoxy 16 is etched away making membrane 50 and the mechanical structures on it suspended.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. A stepping actuator, comprising:
a suspended planar membrane comprising a plurality of movable electrodes, spring hinges, and anchors, and a payload platform, wherein said movable electrode and said payload platform are connected in a series by said spring hinges; and a plurality of anchors connecting said membrane to a substrate, said substrate comprises a plurality of fixed electrodes; wherein said movable electrodes and said fixed electrodes form parallel-plate electrostatic sub-actuators, said parallel-plate electrostatic sub-actuators have graduated air gaps, and said fixed electrodes comprise at least one insulator island.

2. The stepping actuator of claim 1, wherein said insulator island forms at least one set of stairs.

3. The stepping actuator in claim 1, wherein substantially all of said fixed electrodes are electrically connected to each other.

4. The stepping actuator device in claim 1, wherein said fixed electrodes are formed on the steps of a stair-shaped insulator.

5. The stepping actuator device in claim 1 comprises two sets of said electrostatic sub-actuators, wherein said electrostatic sub-actuators are evenly distributed on the opposite sides of said payload platform and are symmetric with respect to a vertical medial plane of said payload platform.

6. A multilevel actuator comprising a plurality of the stepping actuators in claim 1 that are vertically stacked, wherein said payload platform of a lower-level said stepping actuator comprises the substrate of a upper-level said stepping actuator.

7. The stepping actuator of claim 1, wherein said payload platform comprises a mirror.

8. The stepping actuator of claim 1, wherein said stepping actuator is a varactor and wherein said payload platform comprises one electrode plate of said capacitor and said substrate comprises the other electrode plate of said capacitor.

9. The stepping actuator of claim 1, wherein said payload platform comprises at least one focusing lens.

10. The stepping actuator of claim 1, wherein one side of said payload platform hinges on said parallel-plate electrostatic sub-actuators and the opposite side of said payload platform hinges on an anchor.

11. The stepping actuator of claim 1, wherein said fixed electrode comprises insulator bumps in a reticulate metal matrix layer; said insulator bumps are taller than and underlap said reticulate metal matrix layer.

12. The stepping actuator of claim 1, wherein said payload platform comprises an electrode, said substrate comprises another electrode, thereby said stepping actuator device forms a contact switch or a capacitive switch.

13. The stepping actuator of claim 1, wherein said movable electrodes and said fixed electrodes are configured such that said electrostatic sub-actuators move in the lateral direction.

* * * * *